United States Patent
Mawson et al.

(10) Patent No.: US 6,258,903 B1
(45) Date of Patent: Jul. 10, 2001

(54) MIXED CATALYST SYSTEM

(75) Inventors: Simon Mawson, Charleston; Mark G. Goode, Hurricane, both of WV (US)

(73) Assignee: Univation Technologies, Houston, TX (US)

( * ) Notice: Subject to any disclaimer, the term of this patent is extended or adjusted under 35 U.S.C. 154(b) by 0 days.

(21) Appl. No.: 09/215,708

(22) Filed: Dec. 18, 1998

(51) Int. Cl.$^7$ .................................................. C08F 4/42
(52) U.S. Cl. ..................... 526/113; 526/114; 526/118; 526/160; 526/119; 526/86; 526/943; 502/103; 502/113; 502/129; 502/123
(58) Field of Search .................. 526/118, 114, 526/113, 160, 119, 86, 943; 502/113, 103, 129, 123

(56) References Cited

U.S. PATENT DOCUMENTS

| | | |
|---|---|---|
| 3,146,223 | 8/1964 | Cheney . |
| 3,758,603 | 9/1973 | Steigelmann et al. . |
| 3,758,605 | 9/1973 | Hughes et al. . |
| 3,770,842 | 11/1973 | Steigelmann et al. . |
| 3,812,651 | 5/1974 | Steigelmann . |
| 3,844,735 | 10/1974 | Steigelmann et al. . |
| 3,864,418 | 2/1975 | Hughes et al. . |
| 4,014,665 | 3/1977 | Steigelmann . |
| 4,060,566 | 11/1977 | Yahnke . |
| 4,200,714 | 4/1980 | Mahoney et al. . |
| 4,530,914 * | 7/1985 | Ewen et al. .......................... 502/113 |
| 4,701,432 | 10/1987 | Welborn . |
| 4,851,488 | 7/1989 | Burstain . |
| 4,935,474 | 6/1990 | Ewen et al. . |
| 4,937,299 | 6/1990 | Ewen et al. . |
| 5,064,797 | 11/1991 | Stricklen . |
| 5,077,255 | 12/1991 | Welborn . |
| 5,134,208 | 7/1992 | Burstain . |
| 5,194,529 | 3/1993 | McCullough, Jr. et al. . |
| 5,276,115 | 1/1994 | Bohmer et al. . |
| 5,308,811 | 5/1994 | Suga et al. . |
| 5,317,036 | 5/1994 | Brady, III et al. . |
| 5,324,800 | 6/1994 | Welborn, Jr. et al. . |
| 5,359,015 | 10/1994 | Jejelowo et al. . |
| 5,405,922 | 4/1995 | DeChellis et al. . |
| 5,464,905 | 11/1995 | Tsutsui et al. . |
| 5,470,811 | 11/1995 | Jejelowo et al. . |
| 5,516,848 | 5/1996 | Canich . |
| 5,527,752 * | 6/1996 | Reichle et al. ....................... 502/117 |
| 5,672,666 | 9/1997 | Muhle et al. . |
| 5,693,727 * | 12/1997 | Goode et al. .......................... 526/86 |
| 5,753,786 | 5/1998 | Agapiou et al. . |

FOREIGN PATENT DOCUMENTS

| | | |
|---|---|---|
| 0 128 045 | 12/1984 | (EP) . |
| 511 665 A2 | 11/1992 | (EP) . |
| 698 621 A1 | 2/1996 | (EP) . |
| 0 705 851 | 4/1996 | (EP) . |
| 735 060 A2 | 10/1996 | (EP) . |
| 0 768 319 | 4/1997 | (EP) . |
| 770 629 A2 | 5/1997 | (EP) . |
| 778 293 A2 | 6/1997 | (EP) . |
| 6-207058 | 7/1992 | (JP) . |
| 6-206946 | 7/1994 | (JP) . |
| 6-207062 | 7/1994 | (JP) . |
| 7-309908 | 11/1995 | (JP) . |
| 7-309981 | 11/1995 | (JP) . |
| 7-309983 | 11/1995 | (JP) . |
| 7-309982 | 11/1996 | (JP) . |
| 94 25497 | 11/1994 | (WO) . |
| 94/25497 | 11/1994 | (WO) . |
| 96/00246 | 1/1996 | (WO) . |
| 97/10297 | 3/1997 | (WO) . |
| 98/02247 | 1/1998 | (WO) . |

\* cited by examiner

*Primary Examiner*—David W. Wu
*Assistant Examiner*—Ling-Siu Choi
(74) *Attorney, Agent, or Firm*—Jaimes Sher; Lisa Kimes Jones

(57) ABSTRACT

This invention relates to a process to polymerize olefins comprising reacting olefins with a combined catalyst system comprising a hydrogen generating olefin polymerization catalyst and from 10 ppm to 10 weight % of at least one hydrogen consuming olefin polymerization catalyst system, based upon the weight of the total catalyst present, not including any activators or supports.

25 Claims, 1 Drawing Sheet

MIXED CATALYST SYSTEM

FIELD OF THE INVENTION

This invention relates to the use of a second catalyst system to modify the polymer produced by a first catalyst system. In addition this invention relates to the use of two or more different catalysts systems to produce polyolefins. Preferably the two catalysts are selected in such a way that one catalyst has a larger hydrogen index than the other. Alternately the catalysts may be selected in such a way that the first catalyst(s) generates hydrogen and the second catalyst(s) consumes hydrogen during the polymerization process.

BACKGROUND OF THE INVENTION

Cyclopentadienyl transition metal compounds are of particular interest in the polyolefin industry today for their use as polymerization catalysts. For example both biscyclopentadienyl and monocyclopentadienyl transition metal compounds (particularly of groups 4, 5 and 6) are known to polymerize olefins when used in combination with an activator, such as an alumoxane or a non-coordinating anion. Likewise U.S. Pat. No. 5,527,752 discloses a new class of olefin polymerization catalysts based on complexes of a transition metal having pi bonded ligands and heteroallyl moieties combined with an activator such as an alumoxane or a non-coordinating anion. Further copending patent application 09/103620 filed Jun. 23, 1998 assigned to Union Carbide discloses new heteroatom containing catalyst systems. Some of the above catalyst systems generate excess hydrogen during polymerization which can limit the molecular weight of the product while others of these catalyst systems must have hydrogen added to control molecular weight and other factors. Indeed, WO/9425497 notes that "[m]etallocene catalysts that are excessively hydrogen sensitive or generate hydrogen may restrict the process to the making of high melt index materials." Hydrogen generating catalyst systems could produce high molecular weight products if the hydrogen level in the polymerization could be controlled. Thus there is a need in the art to provide a method by which higher molecular weight products can be produced from catalysts that generate hydrogen.

In the past many methods have been tried to reduced or eliminate hydrogen production by such hydrogen producing catalysts. For example, hydrogenation catalysts have been used as hydrogen scrubbers to remove hydrogen from traditional Ziegler-Natta catalyst systems. For more details on hydrogenation catalysts and other hydrogen removal systems please see U.S. Pat. Nos. 3,146,223; 4,200,714; 4,851,488; 5,134,208; 5,194,529; and 5,276,115 and EP 0 778 293 A2. Many of the hydrogen removal systems however are expensive and can leave ash in the product that must be removed. Other means of avoiding the hydrogen problem have included avoiding hydrogen generation all together by discovering catalysts that produce high molecular weight polymers without generating significant amounts of hydrogen. For example WO96/00246 discloses that certain biscyclopentadienyl metallocenes having a specific kind of substitution on the cyclopentadienyl rings produce high molecular weight polymer without the hydrogen problem. The use of certain biscyclopentadienyl compounds that do not generate significant amounts of hydrogen does not, however, address the issue of how to obtain high molecular weight products from catalysts that do generate hydrogen.

This invention addresses this need by discovering that one catalyst system may be used to modify the polymer produced by another catalyst system. This is unusual in that when a second catalyst system is added to a polymerization system one expects that the second catalyst will simply produce its own polymer and not affect the polymer produced by the first catalyst.

Dual catalyst systems have been used in the past for a variety of reasons. For example WO 98/02247 discloses a dual catalyst system of a metallocene and a non-metallocene ($TiCl_4$+alcohol) treated with the contact product of dialkylmagnesium and trialkylsilanol. WO 98/02247 discloses dual metallocene systems and describes the idea that the two different transition metal sources exhibit a different hydrogen response under the same polymerization and hydrogen conditions as critical. Hydrogen response is the sensitivity of the catalyst to manipulation by adding or subtracting hydrogen to the polymerization system to produce different products. Likewise, U.S. Pat. No. 4,935,474 discloses olefin polymerization in the presence of two or more metallocenes (activated with alumoxane) each having a different propagation and termination rate constants. U.S. Pat. No. 5,464,905 discloses a molding polymer composition which comprises a copolymer blend produced from a copolymer produced from two different metallocenes combined with alumoxane and a second copolymer produced with a metallocene and alumoxane. Hydrogen was added to the gas phase polymerizations in the examples. Liquid mixtures of many classes of catalysts are disclosed for use in gas phase polymerization in U.S. Pat. No. 5,693,727. U.S. Pat. No. '727 discloses that more than one liquid metallocene may be employed. The definition of metallocenes includes cyclopentadienyl transition metal compounds and pivalates. However selecting a hydrogen generating catalyst to pair with a hydrogen consuming catalyst is not disclosed. Similarly, EP 0 770 629 A2 discloses a process to produce bimodal polymers using two reactors in series. In some circumstances only the reaction conditions and monomer feeds are changed in the second reactor. In other circumstances a second different catalyst is added to the second reactor. Both cyclopentadienyl transition metal compounds and pivalates are disclosed as catalyst options. However selecting a catalyst having a higher hydrogen index to pair with a catalyst having a lower hydrogen index or selecting a hydrogen generating catalyst to pair with a hydrogen consuming catalyst is not disclosed.

BRIEF DESCRIPTION OF THE INVENTION

This invention relates to a process to polymerize olefins comprising reacting one or more olefins with a catalyst system comprising two catalysts chosen in such a way that the first catalyst (producing the polymer desired to be modified) has a lower hydrogen index than the second catalyst. This invention also relates to a process to polymerize one or more olefins comprising reacting one or more olefins with a catalyst system comprising a hydrogen generating olefin polymerization catalyst and at least one hydrogen consuming olefin polymerization catalyst system, preferably from 10 ppm to 10 weight % of at least one hydrogen consuming olefin polymerization catalyst system, based upon the weight of the total catalyst present, not including any activators or supports.

DETAILED DESCRIPTION OF THE INVENTION

Figure 1:
FIG. 1 illustrates the relationship of the hydrogen indicies for four different catalysts. A is indenylzirconiumtrispivalate which has a hydrogen index of about 10 ppm. B is bis (1-methyl-3-n-butyl) cyclopentadienyl zirconium dichloride which has a hydrogen index of about 100 ppm. C is bis(1-methyl-3-n-butyl)cyclopentadienyl dichloride which has a hydrogen index of about 1000 ppm. D is [[1-(2-pyridyl)N-1-methylethyl]-[1-N-2,6-diisopropylphenyl amido]][2-methyl-1-phenyl-2-propoxy] zirconium dibenzyl which has a hydrogen index of about 10,000 ppm. (assuming all four are activated with methylalumoxane and reacted under the same polymerization conditions.)

This invention relates to the discovery that a polymer produced by one catalyst can be modified by the addition of a second catalyst. The two catalysts are chosen in such a way that the first catalyst (producing the polymer desired to be modified) has a lower hydrogen index than the second catalyst. The hydrogen index is defined as the amount of hydrogen an activated catalyst needs to make a polymer of 1.0 dg/min melt index in a given system. For catalysts that do not ordinarily make polymers having an MI of 1.0 the hydrogen index may be determined by extrapolation. The extrapolation should be done by generating a graph of the log of the melt index versus the log of the ratio of the hydrogen concentration to the ethylene concentration. Generating this graph is done with data obtained by varying the hydrogen concentrations in a gas phase reactor while holding all other reaction conditions constant and measuring the melt index of the resulting polymer (according to ASTM 1238 condition E). Any size reactor and operating conditions may be used to generate the data as long as the same reactor operating under the same conditions is used to generate all the data. Gas composition is monitored by gas chromatograph and the ratio is controlled for at least 5 bed turnovers to produce a lined out sample. The individual catalysts should be activated with the same activator in the same ratios for determining the hydrogen index.

In an alternate embodiment the invention is achieved by a combined catalyst system having at least two catalyst systems where at least one hydrogen generating catalyst system is used in combination with at least one hydrogen consuming catalyst system to produce polymers having higher molecular weight than the polymer produced by the hydrogen generating catalyst alone. By hydrogen consuming catalyst systems is meant those systems that require the addition of hydrogen to the polymerization system to obtain a desired product. The term hydrogen consuming is not meant to mean that the catalyst system itself consumes the hydrogen rather it simply means that hydrogen is provided to the polymerization system to obtain a desired product.

Hydrogen generation is measured by the following procedure:

The amount of hydrogen generated by a given catalyst system is obtained by eliminating the hydrogen feed to the reaction system, then measuring the equilibrium hydrogen level recorded by a calibrated hydrogen analyzer. This data is obtained by holding all other reaction conditions constant. Gas composition is monitored by gas chromatograph and the analyzer is preferably calibrated with a 1000 ppm sample of hydrogen in nitrogen.

In one particular embodiment this invention relates to the use of small amounts of one catalyst system to modify the polymer produced by another catalyst system. In particular, this invention relates to a catalyst system where a first catalyst system is used in combination with small amounts of a second catalyst system that generates hydrogen in an amount of 80% or less of the amount of hydrogen generated by the first catalyst system. Measurement of the hydrogen generation is done on each catalyst separately.

In another embodiment this invention relates to a process to produce polymer comprising reacting olefins with a catalyst system comprising an activator, a first catalyst and a second catalyst, wherein the first catalyst is a hydrogen generating olefin polymerization catalyst and the second catalyst is a hydrogen consuming olefin polymerization catalyst, wherein the polymer produced has (1) a melt index less than or equal to the melt index of a polymer made by the first catalyst under the same polymerization conditions, except that the second catalyst is absent and/or (2) a melt index less than or equal to the melt index of a polymer made by the second catalyst under the same polymerization conditions, except that the first catalyst is absent.

In another embodiment this invention relates to a process to produce polymer (A) comprising reacting olefins with a catalyst system comprising an activator a first catalyst and a second catalyst, wherein the first catalyst is a hydrogen generating olefin polymerization catalyst and the second catalyst is a hydrogen consuming olefin polymerization catalyst, wherein (1) the polymer (A) has a melt index less than or equal to the melt index of a polymer made by the first catalyst under the same polymerization conditions, except that the second catalyst is absent and/or (2) that fraction of polymer (A) that was produced by the first catalyst has melt index less than or equal to the melt index of a polymer made by the first catalyst under the same polymerization conditions, except that the second catalyst is absent.

In one embodiment the fraction of polymer (A) that was produced by the second catalyst has melt index greater than or equal to the melt index that fraction of polymer (A) that was produced by the first catalyst. In another embodiment the fraction of polymer (A) that was produced by the second catalyst has melt index less than the melt index that fraction of polymer (A) that was produced by the first catalyst.

In another embodiment, the fraction of polymer (A) produced by the second catalyst is present at about 0.001 weight % to about 99.999 weight %, based upon the weight of polymer (A) preferably, about 0.001 weight % to about 50 weight %, even more preferably about 0.001 weight % to about 10 weight %.

In another embodiment the melt index of that fraction of polymer (A) produced by the second catalyst is from 1 to ten million times greater than the melt index of that fraction of polymer (A) produced by the first catalyst and/or from 1 to ten million times greater than the melt index of a polymer produced by the first catalyst under the same polymerization conditions, except that the second catalyst is absent.

The melt index of the polymer produced may be changed by manipulating hydrogen concentration in the polymerization system by:

1) changing the amount of the first catalyst in the polymerization system, and/or
2) changing the amount of the second catalyst in the polymerization system, and/or
3) adding hydrogen to the polymerization process; and/or
4) changing the amount of liquid and/or gas that is withdrawn and/or purged from the process; and/or
5) changing the amount and/or composition of a recovered liquid and/or recovered gas returned to the polymerization process, said recovered liquid or recovered gas being recovered from polymer discharged from the polymerization process; and/or
6) using a hydrogenation catalyst in the polymerization process; and/or 7) changing the polymerization temperature; and/or 8) changing the ethylene partial pressure in the polymerization process; and/or 9) changing the ethylene to hexene ratio in the polymerization process; and/or 10) changing the activator to transition metal ratio in the activation sequence.

Any catalyst that generates or consumes hydrogen can be used in the process of this invention. Three classes of catalysts are recommended. They are: (1) cyclopentadienyl transition metal catalysts (2) transition metal complexes having pi bonded ligands and heteroallyl moieties, and (3) heteroatom containing catalyst. Each of these catalysts is typically combined with an activator such as alumoxane, a modified alumoxane or a non-coordinating anion to form an active catalyst system. Once combined with activator the catalysts are typically referred to as a catalyst system. The two catalysts may be combined before or after being combined with the activator and may be combined with the same or different activators.

In one embodiment the second catalyst is one or more cyclopentadienyl transition metal catalysts and the first catalyst system is one or more transition metal complexes having pi bonded ligands and heteroallyl moieties. In a preferred embodiment the two catalysts are activated by the same activator. In another embodiment the second catalyst is a heteroatom containing catalyst and the first catalyst is one or more cyclopentadienyl transition metal catalysts. In a preferred embodiment the two catalysts are activated by the same activator.

In a preferred embodiment the cyclopentadienyl transition metal catalysts comprise a bulky ligand transition metallocene-type catalyst compound including half and full sandwich compounds having one or more bulky ligands including cyclopentadienyl structures or other similar functioning structure such as pentadiene, cyclooctatetraendiyl and imides. The bulky ligands are capable of η-5 bonding to a transition metal atom, for example from Group 4, 5 and 6 of the Periodic Table of Elements.

Bulky ligand transition metallocene-type catalyst systems of the invention are formed from the bulky ligand metallocene-type catalyst compound represented by the formula:

$$(L^p)_m M(A^q)_n (E^r)_o \quad (I)$$

where L is a bulky ligand, substituted or unsubstituted; M is a transition metal (preferably a group 4, 5 or 6 transition metal), p is the anionic charge of L and m is the number of L ligands and m is 1, 2 or 3, A is a ligand bonded to M and capable of inserting an olefin between the M—A bond, q is the anionic charge of A and n is the number of A ligands and n is 1, 2, 3 or 4, and E is an anionic leaving group such as but not limited to hydrocarbyl, hydride, halide, carboxylate or combination thereof or any other anionic ligands; r is the anionic charge of E and o is the number of E ligands and o is 1, 2, 3 or 4 such that (p×m)+(q×n)+(r×o) is equal to the formal oxidation state of the metal center; and activated by an activation system. The activator may be an aluminum alkyl, alumoxane, modified alumoxane or any other oxy-containing organometallic compound or non-coordinating anion, or a combination thereof In another embodiment, when using non-coordinating anions, the bulky ligand transition metallocene-type catalyst systems are preferably those complexes represented by the formula:

$$\{[(L^p)_m M(A^q)_n]^{+k}\}_h [B'^{-j}]_i \quad (II)$$

where L is a substituted or unsubstituted bulky ligand bonded to M, p is the anionic charge of L and m is the number of L ligands and m is 1, 2 or 3; A is a ligand bonded to M and capable of inserting an olefin between the M—A bond, q is the anionic charge of A and n is the number of A ligands and n is 1, 2, 3 or 4, M is a transition metal, and (p×m)+(q×n)+k corresponds to the formal oxidation state of the metal center; where k is the charge on the cation and k is 1, 2, 3 or 4, and B' is a chemically stable, non-nucleophillic anionic complex, preferably having a molecular diameter of 4 Å or greater and j is the anionic charge on B', h is the number of cations of charge k, and i the number of anions of charge j such that h×k =j×i. Such a system may be added preformed to the polymerization or produced in situ the polymerization.

In formulas (I) and (III) above, any two L and/or A ligands may be bridged to each other and/or unbridged. The catalyst compound may be full-sandwich compounds having two or more ligands L, which are cyclopentadienyl derived ligands or substituted cyclopentadienyl derived ligands, or half-sandwich compounds having one ligand L, which is a cyclopentadienyl derived ligand or heteroatom substituted cyclopentadienyl derived ligand or hydrocarbyl substituted cyclopentadienyl derived ligand or moiety such as an indenyl ligand, a benzindenyl ligand or a fluorenyl ligand, an octahydrofluorenyl ligand, a cyclooctatetraendiyl ligand, an azenyl ligand and the like, including hydrogenated versions thereof or any other ligand structure capable of η-5 bonding to the transition metal atom. One or more of these bulky ligands is π-bonded to the transition metal atom; each L can be substituted with a combination, which can be the same or different. Non-limiting examples of substituents include hydrogen or linear, branched alkyl radicals or cyclic alkyl, alkenyl, alkynl or aryl radicals or combination thereof having from 1 to 30 carbon atoms or other substituents having up to 50 non-hydrogen atoms that can also be substituted. Non-limiting examples of alkyl substituents include methyl, ethyl, propyl, butyl, pentyl, hexyl, cyclopentyl, cyclohexyl, benzyl or phenyl groups and the like, including all their isomers, for example tertiary butyl, iso propyl etc. Non-hydrogen substituents include the atoms carbon, silicon, nitrogen, oxygen, tin, germanium and the like including olefins. L may also be other types of bulky ligands including but not limited to bulky amides, phosphides, alkoxides, aryloxides, imides, carbolides, borollides, porphyrins, phthalocyanines, corrins and other polyazomacrocycles. The metal atom, from the Periodic Table of the Elements, may be a Group 3 to 10 metal, preferably, a Group 4, 5 or 6 transition metal or a metal from the lanthanide or actinide series, more preferably the transition metal is from Group 4. Other ligands may be bonded to the transition metal, such as a leaving group, such as but not limited to weak bases such as amines, phosphines, ether, carboxylates, dienes, hydrocarbyl radicals having from 1 to 20 carbon atoms or halogens and the like. In addition to the transition metal, these ligands may be optionally bonded to A or L. Non-limiting examples of such catalyst components and catalyst systems are discussed in for example, U.S. Pat. Nos. 4,530,914, 4,871,705, 4,937,299, 5,124,418, 5,017, 714, 5,120,867, 5,210,352, 5,278,264, 5,278,119, 5,304,614, 5,324,800, 5,347,025, 5,350,723, 5,391,790, 5,391,789, 5,399,636, 5,539,124, 5,455,366, 5,534,473, 5,684,098, 5,693,730, 5,698,634, 5,710,297, 5,712,354, 5,714,427, 5,714,555, 5,728,641 and 5,728,839 all of which are herein fully incorporated by reference. Also, the disclosures of European publications EP-A-0 591 756, EP-A-0 520 732, EP-A-0 420 436, EP-B 1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455 and WO 98/06759 are all herein fully incorporated by reference.

In one embodiment of the invention the bulky ligand transition metallocene-type catalyst systems of the invention include monocyclopentadienyl heteroatom containing transition metal metallocene-type compounds. These metallocene-type compounds are activated by an alumoxane, modified alumoxane, a non-coordinating anion, a Lewis acid or a combination thereof to form an active polymerization catalyst system. These types of catalyst systems are described in, for example, PCT publication WO 92/00333, WO 94/07928, WO 91/ 04257, WO 94/03506, W096/00244 and WO 97/15602 and U.S. Pat. Nos. 5,057, 475, 5,096,867, 5,055,438, 5,198,401, 5,227,440 and 5,264, 405 and European publication EP-A-0 420 436, all of which are herein fully incorporated by reference. Additionally it is within the scope of this invention that the metallocene catalysts and catalyst systems may be those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401 and 5,723,398 and PCT publications WO 93/08221, WO 93/08199 and WO 95/07140 and European publications EP-A-0 578 838, EP-A-0 638 595, EP-B-0 513 380 and EP-A1-0 816 372, all of which are herein fully incorporated by reference.

The preferred transition metal component of the metallocene-type catalyst of the invention are those of Group 4, particularly, titanium, zirconium and hafnium. The transition metal may be in any formal oxidation state, preferably +2, +3 or +4 or a mixture thereof, more preferably +4.

In one embodiment, the catalyst component is represented by the formula:

$(C_5H_{5-d-f}R''_d)_eR'''_fMQ_{g-e}$ (III)

wherein M is a Group 4, 5, 6 transition metal, $(C_5H_{5-d-f}R''_d)$ is the same or different unsubstituted or substituted cyclopentadienyl ligand bonded to M, each R", which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, R'" is one or more or a combination of carbon, germanium, silicon, tin, phosphorous or nitrogen atoms containing radical bridging two $(C_5H_{5-d-f}R''_d)$ ligands, or bridging one $(C_5H_{5-d-f}R''_d)$ ligand to M; each Q which can be the same or different is a hydride, substituted or unsubstituted hydrocarbyl having from 1 to 30 carbon atoms, halogen, alkoxides, aryloxides, amides, phosphides, or any other univalent anionic ligand or combination thereof; also, two Q's together form an alkylidene ligand or cyclometallated hydrocarbyl ligand or other divalent anionic chelating ligand, where g is an integer corresponding to the formal oxidation state of M, d is 0, 1, 2, 3, 4 or 5, f is 0 or 1 and e is 1, 2 or 3.

In another preferred embodiment of this invention the cyclopentadienyl transition metal compound is a monocyclopentadienyl catalyst component represented by the formula:

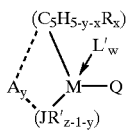

(IV)

wherein M is Ti, Zr or Hf, $(C_5H_{5-y-x}R_x)$ is a cyclopentadienyl ring which is substituted with from 0 to 5 substituent groups R, "x" is 0, 1, 2, 3, 4 or 5 denoting the degree of substitution, and each substituent group R is, independently, a radical selected from a group consisting of $C_1-C_{20}$ hydrocarbyl radicals, substituted $C_1-C_{20}$ hydrocarbyl radicals wherein one or more hydrogen atoms is replaced by a halogen atom, $C_1-C_{20}$ hydrocarbyl-substituted metalloid radicals wherein the metalloid is selected from the Group 14 of the Periodic Table of Elements, and halogen radicals or $(C_5H_{5-y-x}R_x)$ is a cyclopentadienyl ring in which two adjacent R-groups are joined forming $C_4-C_{20}$ ring to give a saturated or unsaturated polycyclic cyclopentadienyl ligand such as indenyl, tetrahydroindenyl, fluorenyl or octahydrofluorenyl;

$(JR'_{z-1-y})$ is a heteroatom ligand in which J is an element with a coordination number of three from Group 15 or an element with a coordination number of two from Group 16 of the Periodic Table of Elements, preferably nitrogen, phosphorus, oxygen or sulfur with nitrogen being preferred, and each R'is, independently a radical selected from a group consisting of $C_1-C_{20}$ hydrocarbyl radicals wherein one or more hydrogen atoms is replaced by a halogen atom, y is 0 or 1, and "z" is the coordination number of the element J;

each Q is, independently any univalent anionic ligand such as halogen, hydride, or substituted or unsubstituted $C_1-C_{30}$ hydrocarbyl, alkoxide, aryloxide, amide or phosphide, provided that two Q may be an alkylidene, a cyclometallated hydrocarbyl or any other divalent anionic chelating ligand; and n may be 0,1 or 2;

A is a covalent bridging group containing a Group 15 or 14 element such as, but not limited to, a dialkyl, alkylaryl or diaryl silicon or germanium radical, alkyl or aryl phosphine or amine radical, or a hydrocarbyl radical such as methylene, ethylene and the like;

L' is a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R, R' or Q and n is 0, 1, 2or 3.

It is contemplated in some embodiments, that the bulky ligands of the metallocene-type catalyst compound of the invention described above are asymmetrically substituted in terms of additional substituents or types of substituents, and/or unbalanced in terms of the number of additional substituents on the bulky ligands or the bulky ligands themselves are different. It is also contemplated that in one embodiment, the metallocene-type catalysts of the invention include their structural or optical or enantiomeric isomers and mixtures thereof.

In a preferred embodiment the transition metal complexes having pi bonded ligands and heteroallyl moieties comprise complexes of a transition metal, a substituted or unsubstituted pi-bonded ligand, and one or more heteroallyl moieties, such as those described in U.S. Pat. No. 5,527,752 and 5,747,406 and EP-B1-0 735 057, all of which are herein fully incorporated by reference. Preferably, the transition metal complex is represented by one of the following formulae:

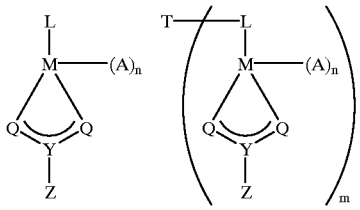

wherein M is a transition metal from Group 4, 5 or 6, preferably titanium, zirconium or hafnium, most preferably zirconium or hafnium; L is a substituted or unsubstituted, pi-bonded ligand coordinated to M, preferably L is a cycloalkadienyl bulky ligand, for example cyclopentadienyl, indenyl or fluorenyl bulky ligands, optionally with one or more hydrocarbyl substituent groups having from 1 to 20 carbon atoms; each Q is independently selected from the group consisting of —O—, —NR—, —CR$_2$— and —S—, preferably oxygen; Y is either C or S, preferably carbon; Z is selected from the group consisting of—OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$ and -H, preferably Z is selected from the group consisting of-OR, -CR$_3$ and —NR$_2$; n is 1 or 2, preferably 1; A is a univalent anionic group when n is 2 or A is a divalent anionic group when n is 1, preferably A is a carbamate, carboxylate, or other heteroallyl moiety described by the Q, Y and Z combination; and each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent; and T is a bridging group selected from the group consisting of alkylene and arylene groups containing from 1 to 10 carbon atoms optionally substituted with carbon or heteroatom(s), germanium, silicon and alkyl phosphine; and m is 2 to 7, preferably 2 to 6, most preferably 2 or 3.

In the formulas above, the supportive substituent formed by Q, Y and Z is a unicharged polydentate ligand exerting electronic effects due to its high polarizability, similar to the cyclopentadienyl ligand. In the most preferred embodiments of this invention, the disubstituted carbamates and the carboxylates are employed. Non-limiting examples of these mono-bulky ligand metallocene-type catalyst compounds include indenyl zirconium tris(diethylcarbamate), indenyl zirconium tris(trimethylacetate), indenyl zirconium tris(p-toluate), indenyl zirconium tris(benzoate), (1-methylindenyl)zirconium tris(trimethylacetate), (2-methylindenyl) zirconium tris(diethylcarbamate), (methylcyclopentadienyl) zirconium tris(trimethylacetate), cyclopentadienyl tris(trimethylacetate), tetrahydroindenyl zirconium tris(trimethylacetate), and (pentamethylcyclopentadienyl) zirconium tris(benzoate). Preferred examples are indenyl zirconium tris(diethylcarbamate), indenyl zirconium tris(trimethylacetate), and (methylcyclopentadienyl) zirconium tris(trimethylacetate).

The heteroatom containing catalysts preferably comprise a compound represented by the formula:

where M is a metal selected from Group 3 to 13 or lanthanide and actinide series of the Periodic Table of Elements; Q is bonded to M and each Q is a monovalent, divalent or trivalent anion; X and Y are bonded to M; X and Y are independently carbon or a heteroatom, provided that at least one of X and Y is a heteroatom, preferably both X and Y are heteroatoms; Y is contained in a heterocyclic ring J, where J comprises from 2 to 50 non-hydrogen atoms, preferably 2 to 30 carbon atoms; Z is bonded to X where Z comprises 1 to 50 non-hydrogen atoms, preferably 1 to 50 carbon atoms or a silyl group, an alkyl silyl group such as a trialkyl silyl, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is the oxidation state of M minus q minus 1 if Q is a monovalent anion, n is (the oxidation state of M–q)/2, if Q is a bivalent anion or n is (the oxidation state of M–q)/3 if Q is a trivalent anion, typically n is an integer from 1 to 4 depending on the oxidation state of M. In one embodiment, if X is oxygen or sulfur then Z is optional. In another embodiment, if X is nitrogen or phosphorous then Z is present. In an embodiment, Z is preferably an aryl group, more preferably a substituted aryl group.

In another embodiment, these the transition metal catalyst compounds are represented by the formula:

where M is a metal selected from Group 3 to 13 of the Periodic Table of Elements, preferably a Group 4 to 12 transition metal, more preferably a Group 4, 5 or 6 transition metal, even more preferably a Group 4 transition metal such as titanium, zirconium or hafnium, and most preferably zirconium;

Each Q is bonded to M and each Q is a monovalent, divalent or trivalent anion. Preferably each Q is independently selected from the group consisting of halogens, hydrogen, alkyl, aryl, alkenyl, alkylaryl, arylalkyl, hydrocarboxy or phenoxy radicals having 1–20 carbon atoms. Each Q may also be amides, phosphides, sulfides, silylalkyls, diketonates, and carboxylates. Optionally, each Q may contain one or more heteroatoms, more preferably each Q is selected from the group consisting of halides, alkyl radicals and arylalkyl radicals. Most preferably, each Q is selected from the group consisting of arylalkyl radicals such as benzyl.

X and Y are both bound to M and are independently carbon or a heteroatom, provided that at least one of X and Y is a heteroatom, X and Y are preferably each heteroatoms, more preferably X and Y are independently selected from the group consisting of nitrogen, oxygen, sulfur and phosphorous, even more preferably nitrogen or phosphorous, and most preferably nitrogen;

Y is contained in a heterocyclic ring or ring system J. J contains from 2 to 30 carbon atoms, preferably from 2 to 7 carbon atoms, more preferably from 3 to 6 carbon atoms, and most preferably 5 carbon atoms. Optionally, the heterocyclic ring J containing Y, may contain additional heteroatoms. J may be substituted with R" groups that are independently selected from the group consisting of hydrogen or linear, branched, cyclic, alkyl radicals, or alkenyl, alkynyl, alkoxy, aryl or aryloxy radicals. Also, two or more R", groups may be joined to form a cyclic moiety such as an aliphatic or aromatic ring. Preferably R" is hydrogen or an aryl group, most preferably R" is hydrogen. When R" is an aryl group and Y is nitrogen, a quinoline group is formed. Optionally, an R" may be joined to A;

Z is a hydrocarbyl group bonded to X preferably Z is a hydrocarbyl group of from 1 to 50 carbon atoms, preferably Z is a cyclic group having from 3 to 30 carbon atoms, preferably Z is a substituted or unsubstituted cyclic group containing from 3 to 30 carbon atoms, optionally including one or more heteroatoms, more preferably Z is an aryl group, most preferably a substituted aryl group in another embodiment Z may be silyl or an alkyl silyl, preferably a trialkyl silyl;

Z may be substituted with R' groups that are independently selected from group consisting of hydrogen or linear, branched, alkyl radicals or cyclic alkyl, alkenyl, alkynyl or aryl radicals. Also, two or more R' groups may be joined to form a cyclic moiety such as an aliphatic or aromatic ring. Preferably R' is an alkyl group having from 1 to 20 carbon atoms, more preferably R' is methyl, ethyl, propyl, butyl, pentyl and the like, including isomers thereof, more preferably R' is a methyl group, or a primary, secondary or tertiary hydrocarbon, including isopropyl, t-butyl and the like, most preferably R' is an isopropyl group. Optionally, an R' group may be joined to A. It is preferred that at least one R' is ortho to X;

A is a bridging group joined to at least one of, preferably both of, X and J. Bridging group A contains one or more Group 13 to 16 elements from Periodic Table of Elements. More preferably A contains one or more Group 14 elements, most preferably A is a substituted carbon group, a di-substituted carbon group or vinyl group; and In formula (II) m and p are independently an integer from 0 to 5, preferably m is 2; n is the oxidation state of M minus q minus 1 if Q is a monovalent anion, n is (the oxidation state of M−q)/2, if Q is a bivalent anion or n is (the oxidation state of M−q)/3 if Q is a trivalent anion, preferably n is an integer from 1 to 4; and q is 1 or 2, and where q is 2, the two ((R'$_m$Z)XA(YJR"$_m$)) of formula (II) are bridged to each other via a bridging group, preferably a bridging group containing a Group 14 element. In a preferred embodiment when n is 2 or 3 in formula I or II and the second catalyst is the same as the first catalyst except that one Q group is a hydrocarboxy group, a boronate or an amide. In a particularly preferred embodiment when n is 2 or 3 in formula I or II, then the second catalyst is the same as the first catalyst except that one Q group is an alkoxide, phenoxide, acetylacetonate, carboxylate, cyclopentadienyl, flourenyls or an indenyl group. In another particularly preferred embodiment when n is 2 or 3 in formula I or II the second catalyst is the same as the first catalyst except that one Q group of the second catalyst is a hydrocarboxy adduct of the analogous Q group on the first catalyst, preferably an alkoxide adduct, a boronate, a phenoxide adduct, an acetylacetonate adduct, a carboxylate adduct, an amide adduct, a cyclopentadienyl adduct, a flourenyl adduct or an indenyl adduct.

In one embodiment of the invention, the compound is represented by the formula:

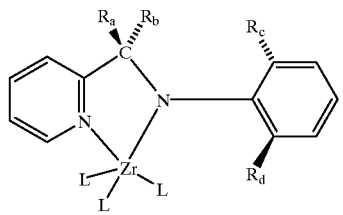

wherein $R_a$ and $R_b$ are each independently selected from the group consisting of alkyl, aryl, heterocyclic groups, and hydrogen; $R_c$ and $R_d$ are each independently selected from the group consisting of alkyl, aryl, and hydrogen; and each L has the meaning stated above.

In another embodiment of the invention, the compound is represented by the formula:

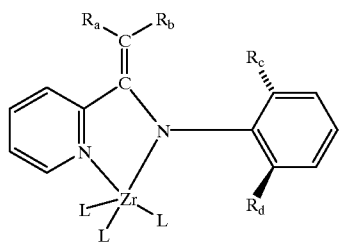

wherein $R_a$, $R_b$, $R_c$, $R_d$, and L have the meanings stated above.

In yet another embodiment of the invention, the compound is represented by the formula:

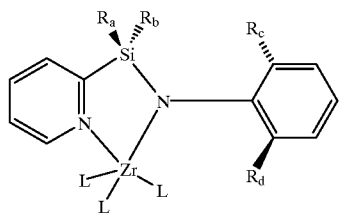

wherein $R_a$, $R_b$, $R_c$, $R_d$, and L have the meanings stated above.

In a particularly preferred embodiment of the invention, the compound is represented by the formula:

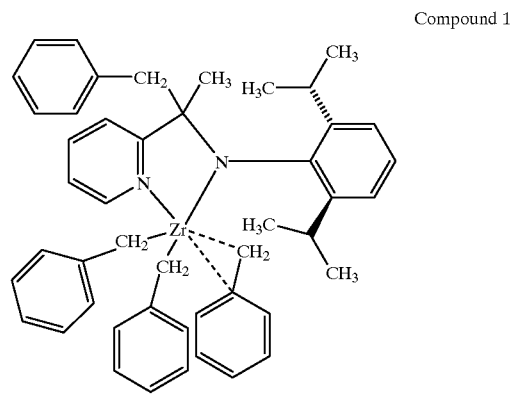

Compound 1

In another particularly preferred embodiment of the invention, the compound is represented by the formula:

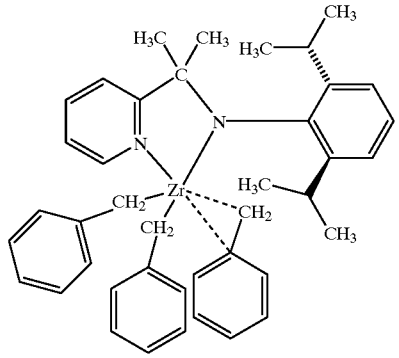

Compound 2

In further particularly preferred embodiment of the invention, the compound is represented by the formula:

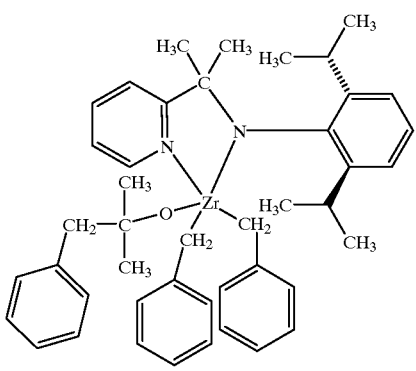

Compound 3

Yet another preferred compound is represented by the formula:

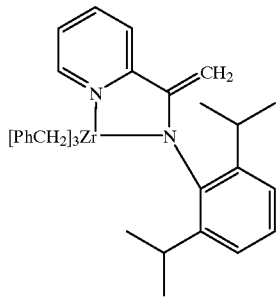

Compound 4

For the purposes of this patent specification and appended claims, the term "activator" is defined to be any compound or component which can activate a catalyst compounds as described above, for example, a Lewis acid or a non-coordinating ionic activator or ionizing activator or any other compound that can convert a neutral metallocene catalyst component to a metallocene cation. It is within the scope of this invention to use alumoxane or modified alumoxane as an activator, and/or to also use ionizing activators, neutral or ionic, such as tri (n-butyl)ammonium tetrakis(pentafluorophenyl)boron or a trisperfluorophenyl boron metalloid precursor which ionize the neutral metallocene compound.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253 and 5,731,451 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299 and 5,502,124 and U.S. patent application Ser. No. 08/285,380, filed Aug. 3, 1994, all of which are herein fully incorporated by reference. Other activators include those described in PCT publication WO 98/07515 such as tris (2, 2', 2",-nonafluorobiphenyl) fluoroaluminate, which is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. Also, methods of activation such as using radiation and the like are also contemplated as activators for the purposes of this invention.

The catalysts/activators/catalyst systems can be combined in situ or before being placed in the polymerization reactor. Further one catalyst can be activated and the second catalyst just added to the already activated polymerization mixture. Likewise one or more of the catalyst systems may be supported on an organic or inorganic support. Typical supports include silica, clay, talc magnesium chloride and the like. The catalysts may be placed on separate supports or may be placed on the same support. Likewise the activator may be placed on the same support as the catalyst or may be placed on a separate support. The catalysts/catalyst systems and/or their components need not be feed into the reactor in the same manner. For example, one catalyst or its components may slurried into the reactor on a support while the other catalyst or components are provided in a solution.

In one embodiment, in selecting the two (or more) catalysts to be used in combination, it is preferred that the second catalyst generate at least 20% less hydrogen, preferably at least 30% less, even more preferably at least 50% less, even more preferably at least 80% less hydrogen that the first catalyst.

In another preferred embodiment, the first catalyst has a hydrogen index lower than the second catalyst. In a preferred embodiment the second catalyst has a hydrogen index that is at least 2 times higher preferably at least 5 times higher, even more preferably at least 8 times higher, even more preferably at least 10 times higher, even more preferably at least 15 times higher, even more preferably at least 20 times higher than the hydrogen index of the first catalyst.

Further in one preferred embodiment, the two catalysts are chosen such that the products they independently produce without the presence of the other are roughly of the same melt flow rate. By matching the products, the final product of the two catalysts tends to remain unimodal. In another embodiment the molecular weights of the two are not roughly matched and a bimodal product may or may not be obtained.

In a particularly preferred embodiment bis(1methyl, 3-n-butylcyclopentadienyl) zirconium dichloride is used in combination with indenylzirconiumtrispivalate and methylalumoxane.

In one embodiment, the catalysts are typically combined such that the second catalyst (the hydrogen consuming catalyst or the catalyst having the higher hydrogen index) is present at from 10 ppm to 10 weight % based upon the weight of the first and second catalysts but not the activators or supports, preferably 100 ppm to 8 weight %, even more preferably 1000 ppm to 5 weight %.

We have found that by using such hydrogen consuming catalysts (i.e. catalysts that generate at least 20% less hydrogen) or catalysts that have a higher hydrogen index, that we have actually been able to reduce the Melt Index (increase the molecular weight) of the product produced by a hydrogen generating catalyst. In the examples below we were able to reduce the melt index of one particular polymer to below 1 dg/min.

In another embodiment of the invention the catalysts are combined such that the second catalyst (the hydrogen consuming catalyst or the catalyst having the higher hydrogen index) is present at from 10 ppm to 95 weight % based upon the weight of the first and second catalysts but not the activators or supports, preferably 10 ppm weight % to 50 weight %, even more preferably 5 weight % to 10 weight %.

Polymerization Process of the Invention

The catalysts and catalyst systems described above are suitable for use a solution, gas or slurry polymerization process or a combination thereof, most preferably a gas or slurry phase polymerization process.

In one embodiment, this invention is directed toward the solution, slurry or gas phase polymerization reactions involving the polymerization of one or more of monomers having from 2 to 30 carbon atoms, preferably 2–12 carbon atoms, and more preferably 2 to 8 carbon atoms. Preferred monomers include one or more of ethylene, propylene, butene-1, pentene-1,4-methyl-pentene-1, hexene-1, octene-1, decene-1,3-methyl-pentene-1, and cyclic olefins or a combination thereof Other monomers can include vinyl monomers, diolefins such as dienes, polyenes, norbornene, norbornadiene monomers. Preferably a homopolymer of ethylene is produced. In another embodiment, a copolymer of ethylene and one or more of the monomers listed above is produced.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/ norbornene and the like.

In a particularly preferred embodiment the process of the invention relates to the polymerization of ethylene and at least one comonomer having from 4 to 8 carbon atoms, preferably 4 to 7 carbon atoms. Particularly, the comonomers are butene-1, 4-methyl-pentene-1,3-methyl-pentene-1, hexene-1 and octene-1, the most preferred being hexene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C to about 95° C.

The productivity of the catalyst or catalyst system in a gas phase system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent. A preferred process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference. In another preferred embodiment the one or all of the catalysts are tumbled with up to 6 weight % of aluminum stearate, based upon the weight of the catalyst, any support and the stearate, preferably 2 to 3 weight %.

In a preferred embodiment, the polyolefin recovered typically has a melt index as measured by ASTM D-1238, Condition E, at 190° C. of 1g/10 min or less, preferably between 0.01 and 5 dg/min. In a preferred embodiment the polyolefin is ethylene homopolymer or copolymer. The comonomer is preferably a C3 to C20 linear branched or cyclic monomer, and in one embodiment is a C3 to C12 linear or branched alpha-olefin, preferably propylene, hexene, pentene, hexene, heptene, octene, nonene, decene, dodecene, 4-methyl-pentene-1,3-methyl pentene-1,3,5,5-trimethyl hexene 1, and the like.

In a preferred embodiment the catalyst system described above is used to make a linear low density polyethylene having a density of between 0.915 and 0.0950 g/cm$^3$ (as measured by ASTM 2839), a melt index of 1.0 or less g/10 min or less (as measured by ASTM D-1238, Condition E, at 190° C.).

The polyolefins then can be made into films, molded articles, sheets and the like. The films may be formed by any of the conventional technique known in the art including extrusion, co-extrusion, lamination, blowing and casting. The film may be obtained by the flat film or tubular process which may be followed by orientation in an uniaxial direction or in two mutually perpendicular directions in the plane of the film to the same or different extents. Particularly preferred methods to form the polymers into films include extrusion or coextrusion on a blown or cast film line.

The films produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, glass beads and the like. The additives may be present in the typically effective amounts well known in the art, such as 0.001 weight % to 10 weight %.

EXAMPLES 20 grams of powdered bis(1-methyl-3-n-butyl) cyclopentadienyl zirconium dichloride dissolved in hexane (for a 1.5 wt % solution) was combined with 410 grams of indenylzirconiumtrispivalate dissolved in hexane (for a 1.0 wt % solution). Modified MAO was used as the activator (3.65 wt % Al in isopentane purchased form Akzo under the name MMAO 3A) The Al:Zr ratio was 300:1. The catalyst mixture was fed at 8 cc/hr with 0.28 pph isopentane carrier, 3.5 pph nitrogen carrier 0.034 pph hexene. The alumoxane was introduced on line before the addition to the isopentane and the nitrogen. The reactor temperature and ethylene partial pressure were held at 85° C and 220 psi, (1517kPa) respectively. The hydrogen concentration equilibrated to approximately 54 ppm. An ethylene hexene copolymer was recovered.

Example 2

The procedure of Example 1 was repeated except that no bis (1-methyl 3-n-butyl) cyclopentadienyl zirconium dichloride was used, the solution was feed at 6 cc/hr with 0.29 pph isopentane carrier and 3.5 pph nitrogen carrier. Hexene was maintained at 0.040 pph. The hydrogen concentration equilibrated to approximately 160 ppm. An ethylene hexene copolymer was recovered.

A comparison of the two products produced is presented in Table 1.

TABLE 1

| Property | Example 1 | Example 2 |
| --- | --- | --- |
| Melt index | 0.174 dg/min | 1.34 dg/min |
| Density | 0.920 g/cc | 0.920 g/cc |
| Hydrogen concentration | 54 ppm | 164 ppm |
| Hexene/Ethylene | 0.02 | 0.03 |

Note that with the additional amount of bis (1-methyl-3-n-butyl) cyclopentadienyl zirconium dichloride, a catalyst known to produce lower molecular weight, that the molecular weight of the final product decreased from an MI of 1.34 dg/min to an MI of 0.174 dg/min.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly it is not intended that the invention be limited thereby.

What is claimed is:

1. A process to polymerize olefins comprising reacting olefins with a catalyst system comprising a hydrogen generating olefin polymerization catalyst and from 0.001 weight % to 10 weight % of at least one hydrogen consuming olefin polymerization catalyst, based upon the weight of the total catalyst present, not including any activators or supports.

2. The process of claim 1 wherein the hydrogen generating catalyst comprises a transition metal compound represented by one of the following formulae:

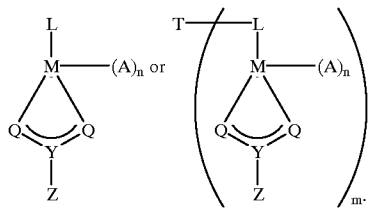

wherein M is a transition metal from Group 4, 5 or 6; L is a substituted or unsubstituted, pi-bonded ligand coordinated to M, optionally with one or more hydrocarbyl substituent groups having from 1 to 20 carbon atoms; each Q is independently selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H; and substituted or unsubstituted aryl groups, with the proviso that when Q is —NR— then Z is selected from the group consisting of —OR, —NR$_2$, —SR, —SiR$_3$, —PR$_2$ and —H; n is 1 or 2; A is a univalent anionic group when n is 2 or A is a divalent anionic group when n is 1; each R is independently a group containing carbon, silicon, nitrogen, oxygen, and/or phosphorus where one or more R groups may be attached to the L substituent; and T is a bridging group selected from the group consisting of alkylene and arylene groups containing from 1 to 10 carbon atoms optionally substituted with carbon or heteroatom(s), germanium, silicon and alkyl phosphine; and m is 2 to 7.

3. The process of claim 1 wherein the hydrogen consuming catalyst system comprises a cyclopentadienyl transition metal catalyst.

4. The process of claim 1 wherein the hydrogen consuming catalyst system generates at least 50% less hydrogen than the hydrogen generating catalyst.

5. The process of claim 1 wherein the hydrogen generating catalyst comprises indenylzirconiumtrispivalate and the hydrogen consuming catalyst system is bis (1-methyl, 3-n-butyl) cyclopentadienyl zirconium dichloride.

6. The process of claim 1 wherein the hydrogen generating catalyst comprises a transition metal compound which is represented by the formulae:

or

where M is a metal selected from Group 3 to 13 or lanthanide and actinide series of the Periodic Table of Elements; Q is bonded to M and each Q is a monovalent, bivalent, or trivalent anion; X and Y are bonded to M; X and Y are independently carbon or a heteroatom, provided that at least one of X and Y is a heteroatom and Y is contained in a heterocyclic ring J, where J comprises from 2 to 50 non-hydrogen atoms; Z is bonded to X, where in formula I Z comprises 1 to 50 non-hydrogen atoms and in formula II Z is a hydrocarbyl group, optionally including one or more heteroatoms; t is 0 or 1; when t is 1, A is a bridging group joined to at least one of X, Y or J; q is 1 or 2; n is the oxidation state of M minus q minus 1 if Q is a monovalent anion, n is (the oxidation state of M−q)/2, if Q is a bivalent anion or n is (the oxidation state of M−q)/3 if Q is a trivalent anion, R" groups are independently selected from the group consisting of hydrogen or linear, branched, cyclic, alkyl radicals, or alkenyl, alkynl, alkoxy, aryl or aryloxy radicals and two or more R" groups may be joined to form a cyclic moiety, optionally, an R" may be joined to A;

R' groups are independently selected from group consisting of hydrogen or linear, branched, alkyl radicals or cyclic alkyl, alkenyl, alkynl or aryl radicals, two or more R' groups may be joined to form a cyclic moiety, optionally, an R' group may be joined to A; and m is independently an integer from 0 to 5.

7. The process of claim 6 wherein the hydrogen consuming catalyst is a cyclopentadienyl transition metal compound or a transition metal compound represented by one of the following formulae:

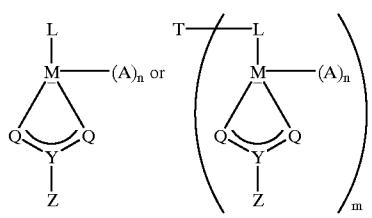

wherein M is a transition metal from Group 4,5 or 6; L is a substituted or unsubstituted, pi-bonded ligand coordinated to M, optionally with one or more hydrocarbyl substituent groups having from 1 to 20 carbon atoms; each Q is independently selected from the group consisting of —O—, —NR—, —CR$_2$—and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$ and —H; n is 1 or 2; A is a univalent anionic group when n is 2 or A is a divalent anionic group when n is 1; each R is independently a group containing carbon, silicon, nitrogen, oxygen, and/or phosphorus where one or more R groups may be attached to the L substituent; and T is a bridging group selected from the group consisting of alkylene and arylene groups containing from 1 to 10 carbon atoms optionally substituted with carbon or heteroatom(s), germanium, silicon and alkyl phosphine; and m is 2 to 7.

8. A method to increase the molecular weight of a polymer produced by a hydrogen producing catalyst system comprising adding 0.001 weight % to 5 weight % of a catalyst system that generates at least 20% less hydrogen than the hydrogen producing catalyst system to the hydrogen producing catalyst system.

9. A method to increase the melt index of a polymer comprising adding from 0.001 weight % to 5 weight % of bis(1-methyl, 3-n-butyl) cyclopentadienyl zirconium dichloride to a polymerization system comprising a transition metal compound represented by one of the following formulae:

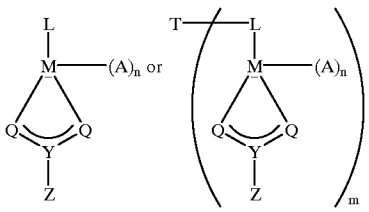

wherein M is a transition metal from Group 4, 5 or 6; L is a substituted or unsubstituted, pi-bonded ligand coordinated to M, optionally with one or more hydrocarbyl substituent groups having from 1 to 20 carbon atoms; each Q is independently selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$ and —H; n is 1 or 2; A is a univalent anionic group when n is 2 or A is a divalent anionic group when n is 1; each R is independently a group containing carbon, silicon, nitrogen, oxygen, and/or phosphorus where one or more R groups may be attached to the L substituent; and T is a bridging group selected from the group consisting of alkylene and arylene groups containing from 1 to 10 carbon atoms optionally substituted with carbon or heteroatom(s), germanium, silicon and alkyl phosphine; and m is 2 to 7.

10. A process to polymerize olefins comprising reacting olefins with a catalyst system comprising at least one activator, a first catalyst and a second catalyst, wherein the first catalyst has a hydrogen index lower than the second catalyst's hydrogen index.

11. The process of claim 10 wherein the second catalyst has a hydrogen index that is at least 2 times higher than the hydrogen index of the first catalyst.

12. The process of claim 10 wherein the second catalyst has a hydrogen index that is at least 5 times higher than the hydrogen index of the first catalyst.

13. The process of claim 10 wherein the second catalyst has a hydrogen index that is at least 8 times higher than the hydrogen index of the first catalyst.

14. The process of claim 10 wherein the second catalyst has a hydrogen index that is at least 10 times higher than the hydrogen index of the first catalyst.

15. The process of claim 10 wherein the first catalyst comprises indenylzirconiumtrispivalate and the second catalyst system is bis (1-methyl, 3-n-butyl) cyclopentadienyl zirconium dichloride.

16. The process of claim 10 wherein the second catalyst system is bis (1-methyl, 3-n-butyl) cyclopentadienyl zirconium dihalide.

17. The process of claim 10 wherein the first catalyst is present at about 10 ppm to about 10 weight %, based upon the weight of the first and second catalyst, but not the activators or any supports, if present.

18. The process of claim 10 wherein the activator is an alumoxane.

19. A process to produce polymer comprising reacting olefins with a catalyst system comprising an activator, a first catalyst and a second catalyst, wherein the first catalyst is a hydrogen generating olefin polymerization catalyst and the second catalyst is a hydrogen consuming olefin polymerization catalyst, wherein the polymer produced has (1) a melt index less than or equal to the melt index of a polymer made by the first catalyst under the same polymerization conditions, except that the second catalyst is absent and (2) a melt index less than or equal to the melt index of a polymer made by the second catalyst under the same polymerization conditions, except that the first catalyst is absent.

20. A process to produce polymer (A) comprising reacting olefins with a catalyst system comprising an activator a first catalyst and a second catalyst, wherein the first catalyst is a hydrogen generating olefin polymerization catalyst and the second catalyst is a hydrogen consuming olefin polymerization catalyst, wherein (1) the polymer (A) has a melt index less than or equal to the melt index of a polymer made by the first catalyst under the same polymerization conditions, except that the second catalyst is absent and (2) that fraction of polymer (A) that was produced by the second catalyst has melt index greater than or equal to the melt index of a polymer made by the second catalyst under the same polymerization conditions, except that the first catalyst is absent.

21. The process of claim 20 wherein that fraction of polymer (A) produced by the second catalyst is present at about 0.001 weight % to about 99.999 weight %, based upon the weight of polymer (A).

22. The process of claim 20 wherein that fraction of polymer (A) produced by the second catalyst is present at about 0.001 weight % to about 50 weight %, based upon the weight of polymer (A).

23. The process of claim 20 wherein that fraction of polymer (A) produced by the second catalyst is present at about 0.001 weight % to about 10 weight %, based upon the weight of polymer (A).

24. The process of claim 20 wherein the melt index of that fraction of polymer (A) produced by the second catalyst is from 2 to ten million times greater than the melt index of that fraction of polymer (A) produced by the first catalyst.

25. The process of claim 20 further comprising manipulating hydrogen concentration in the polymerization system and or the melt index of the polymer (A) by:

1) changing the amount of the first catalyst in the polymerization system, and/or
2) changing the amount of the second catalyst in the polymerization system, and/or
3) adding hydrogen to the polymerization process; and/or
4) changing the amount of liquid and/or gas that is withdrawn and/or purged from the process; and/or
5) changing the amount and/or composition of a recovered liquid and/or recovered gas returned to the polymerization process, said recovered liquid or recovered gas being recovered from polymer discharged from the polymerization process; and/or 6) using a hydrogenation catlayst in the polymerization process; and/or 7) changing the polymerization temperature; and/or 8) changing the ethylene partial pressure in the polymerization process.

* * * * *